(12) United States Patent
Rosenthal et al.

(10) Patent No.: US 8,687,661 B2
(45) Date of Patent: Apr. 1, 2014

(54) PULSED CO$_2$ LASER OUTPUT-PULSE SHAPE AND POWER CONTROL

(75) Inventors: Peter Rosenthal, West Simsbury, CT (US); John Kennedy, Granby, CT (US); Vern Seguin, Windsor, CT (US); David Allie, Storrs, CT (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 13/467,890

(22) Filed: May 9, 2012

(65) Prior Publication Data

US 2013/0272325 A1    Oct. 17, 2013

Related U.S. Application Data

(60) Provisional application No. 61/624,096, filed on Apr. 13, 2012.

(51) Int. Cl.
*H01S 3/10*    (2006.01)

(52) U.S. Cl.
USPC ............................................. 372/25

(58) Field of Classification Search
USPC ................... 372/81, 55, 25, 38.02, 30
See application file for complete search history.

(56) References Cited

U.S. PATENT DOCUMENTS

| 4,539,685 | A | 9/1985 | Hart et al. | |
|---|---|---|---|---|
| 7,508,850 | B2 | 3/2009 | Newman et al. | |
| 2002/0110158 | A1* | 8/2002 | Stamm et al. | 372/19 |
| 2006/0045150 | A1* | 3/2006 | Newman et al. | 372/25 |
| 2007/0086495 | A1* | 4/2007 | Sprague et al. | 372/38.02 |
| 2007/0173808 | A1* | 7/2007 | Goble | 606/34 |
| 2011/0085575 | A1 | 4/2011 | Allie | |
| 2011/0182319 | A1* | 7/2011 | Hua et al. | 372/55 |
| 2012/0189031 | A1* | 7/2012 | Fontanella | 372/55 |

FOREIGN PATENT DOCUMENTS

| WO | 02/090037 A1 | 11/2002 |
|---|---|---|
| WO | 2008/091446 A1 | 7/2008 |

OTHER PUBLICATIONS

International Search Report and Written Opinion received for PCT Patent Application No. PCT/US2013/035530, mailed on Oct. 22, 2013, 13 pages.
Allie et al., et al., U.S. Appl. No. 13/365,125, filed Feb. 2, 2012, titled "Output-Power Control Apparatus for a CO2 Gas-Discharge Laser", 26 pages.

* cited by examiner

*Primary Examiner* — Jessica Stultz
*Assistant Examiner* — Tuan Nguyen
(74) *Attorney, Agent, or Firm* — Morrison & Foerster LLP

(57) ABSTRACT

In order to maintain a constant laser output pulse power in a RF-energized, sealed-off, diffusion cooled, pulsed, CO$_2$ gas-discharge laser, each laser output pulse is generated by train or burst of shorter RF pulses. When the time between laser output pulses becomes short enough that the power in one pulse would be reduced by gas-discharge heating effects of a previous pulse, power in the RF pulse trains is varied by varying the duration or duty cycle of pulses in the bursts, thereby keeping output-pulse power in the laser output pulses constant. RF pulses in any burst can have a different duration for tailoring the temporal shape of a corresponding laser-output pulse.

18 Claims, 9 Drawing Sheets

PULSED CO₂ LASER OUTPUT-PULSE SHAPE AND POWER CONTROL

PRIORITY CLAIM

This application claims priority of U.S. Provisional Application No. 61/624,096, filed Apr. 13, 2012, the complete disclosure of which is hereby incorporated herein by reference.

TECHNICAL FIELD OF THE INVENTION

The present invention relates in general to output power control in radio-frequency (RF) energized, pulsed carbon dioxide ($CO_2$) gas-discharge lasers. The invention relates in particular to providing constant power from one laser output pulse to a next, and also to controlling the temporal shape of output pulses of such lasers.

DISCUSSION OF BACKGROUND ART

In a RF-energized sealed-off diffusion cooled pulsed $CO_2$ gas-discharge laser, if time between pulses becomes short enough, the diffusion cooling can become overwhelmed resulting in a temperature rise in the $CO_2$ lasing gas mixture. This can affect the characteristics of output pulses, particularly the rise and fall of the output pulses. This can lead to an inconsistency in power from pulse to pulse and accordingly variations in average power. A typical lasing-gas mixture includes helium (He), nitrogen ($N_2$) and $CO_2$ in proportions of about 80:10:10.

FIG. 1A and FIG. 1B provide a timing diagram comparing a relationship between an RF pulse (FIG. 1A) energizing a prior-art diffusion cooled $CO_2$ gas-discharge laser and a resulting laser output pulse (FIG. 1B) from the laser. It is assumed that the laser is tuned to operate (lase) at a wavelength of about 10.6 micrometers (μm). The RF pulse is initiated at time $t_0$ and terminated at time $t_3$. As depicted here, the RF pulse has a duration of about 100 microseconds or greater.

Initially there is no laser output as time is required for $N_2$ in the lasing gas mixture to be energized by the RF and then transfer that energy to the $CO_2$ by collision. After a relatively short time, there is an initial gain-spike (power spike) in the lasing gas mixture which drops to almost zero at time $t_1$. Because of the very short duration, the energy in this power-spike is not significant from the process perspective. Following the power-spike, the laser output power rises progressively. This period of rising power is designated $\tau_R$ in FIG. 1B. During this time, the temperature of the gas mixture is rising, and at time $t_2$ the gain (at the 10.6 μm $CO_2$ wavelength for which the laser is tuned) begins to gradually fall as a result of competition between energy transitions for the 10.6 μm wavelength and for another lasing wavelength at about 9.6 μm (for which the laser-resonator is assumed not to be tuned). A detailed description of the physics of the gain-reduction is not necessary for understanding principles of the present invention and is not presented herein. This gradual falling period of the 10.6 μm-power, due to heating of the lasing gas mixture, is designated in FIG. 1B as period $\tau_H$. At time $t_3$, when the RF pulse is terminated, gain, and accordingly the laser pulse power, falls exponentially toward zero over a fall-time designated in FIG. 1B as period $\tau_F$.

If the pulse RF-pulse duration is made sufficiently short, the gas-heating effect in an individual laser pulse as depicted in FIG. 1B can be avoided. However, in a train of laser-pulses with a sufficiently short duration between pulses, gas-heating still occurs but the effect is manifest in a different way, discussed below.

FIG. 2A and FIG. 2B provide a timing diagram comparing a relationship between a train of three RF pulses $A_{RF}$, $B_{RF}$, and $C_{RF}$ (FIG. 2A) and resulting laser output pulses $A_L$, $B_L$, and $C_L$, respectively. It is assumed, here, that the RF pulses are delivered at a pulse-repetition frequency F that provides a time T between pulses on the order of 0.15 milliseconds (ms). The pulse duration ($T_P$) is assumed to be about 25 microseconds (μs). This pulse duration is sufficiently short that the $t_H$ effect of FIG. 1B is avoided. The time between pulses however is sufficiently short that the lasing gas does not return to the temperature at which one pulse is initiated before the next is initiated. A result of this is that the peak power $P_{L2}$ of pulse $B_L$ is less than the peak power $P_{L1}$ of pulse $A_L$, and the peak power $P_{L3}$ of pulse $C_L$ is less than the peak power $P_{L2}$ of pulse $B_L$. This peak power reduction from one pulse to the next continues until a steady state gas-heating condition is reached. In the case of the exemplary 0.15 ms between pulses, and for a lasing gas pressure of about 100 Torr, this may not occur until about 7 pulses have been delivered.

FIG. 3 is a graph schematically illustrating measured amplitude ratio (indicated by diamonds) between isolated laser-output pulse pairs as a function of time between pulses in a prior-art diffusion-cooled $CO_2$ laser. The circle indicates that pulse separation time that corresponds to a pulse repetition frequency of 3 kilohertz (kHz). The RF pulse duration (excitation pulses) in this case was about 25 μs, but similar results were obtained with RF pulses having a duration of 50 μs. It can be seen that amplitudes of consecutive pulses become about equal when time between pulses is between about 750 and 1000 microseconds or greater.

For delicate laser machining operations, such as laser drilling of via holes in printed circuit boards (PCBs), maintaining pulse-to-pulse consistency is very important. An onset of pulse inconsistency defines an upper limit to the pulse-repetition rate that can be used, and accordingly a limit to the throughput of the operation. In most cases, the steady-state condition is not an option, because a particular drilling sequence requires require pulses-on-demand at irregular intervals. Accordingly, there is need for a method and apparatus that can maintain pulse-to-pulse consistency of laser output pulses triggered on demand with relatively short intervals therebetween.

SUMMARY OF THE INVENTION

The present invention is directed to a method of operating a gas-discharge laser for providing laser output in the form of laser output pulses. The laser includes spaced apart gas-discharge electrodes powered by a radio frequency power supply (RFPS), with a laser-resonator formed between the discharge electrodes.

In one aspect of the invention the method comprises delivering a first train of RF pulses from the RFPS to the gas-discharge electrodes for energizing the laser-resonator. The RF pulses in the first train thereof are temporally spaced apart by a time sufficiently short that the laser-resonator responds to the first train of RF pulses as though the first train of RF pulses were a single RF pulse, whereby the laser-resonator delivers a first laser-output pulse in response to the energizing by the first train of RF pulses.

In another aspect, the method may further include, following delivery of the first train of RF pulses, delivering a second train of RF pulses from the RFPS to the gas-discharge electrodes for energizing the laser-resonator. The RF pulses in the second train of RF pulses are also temporally spaced apart by a time sufficiently short that the laser-resonator responds to the second train of RF pulses as though the second train of RF pulses were a single RF pulse, whereby, following delivery of the first single laser output pulse, the laser-resonator delivers a second laser-output pulse in response to the energizing by the second train of RF pulses. One of the duration and number of RF pulses in the second train thereof is selected such that the first and second laser output pulses have about equal power.

DETAILED DESCRIPTION OF THE INVENTION

Figure 4:
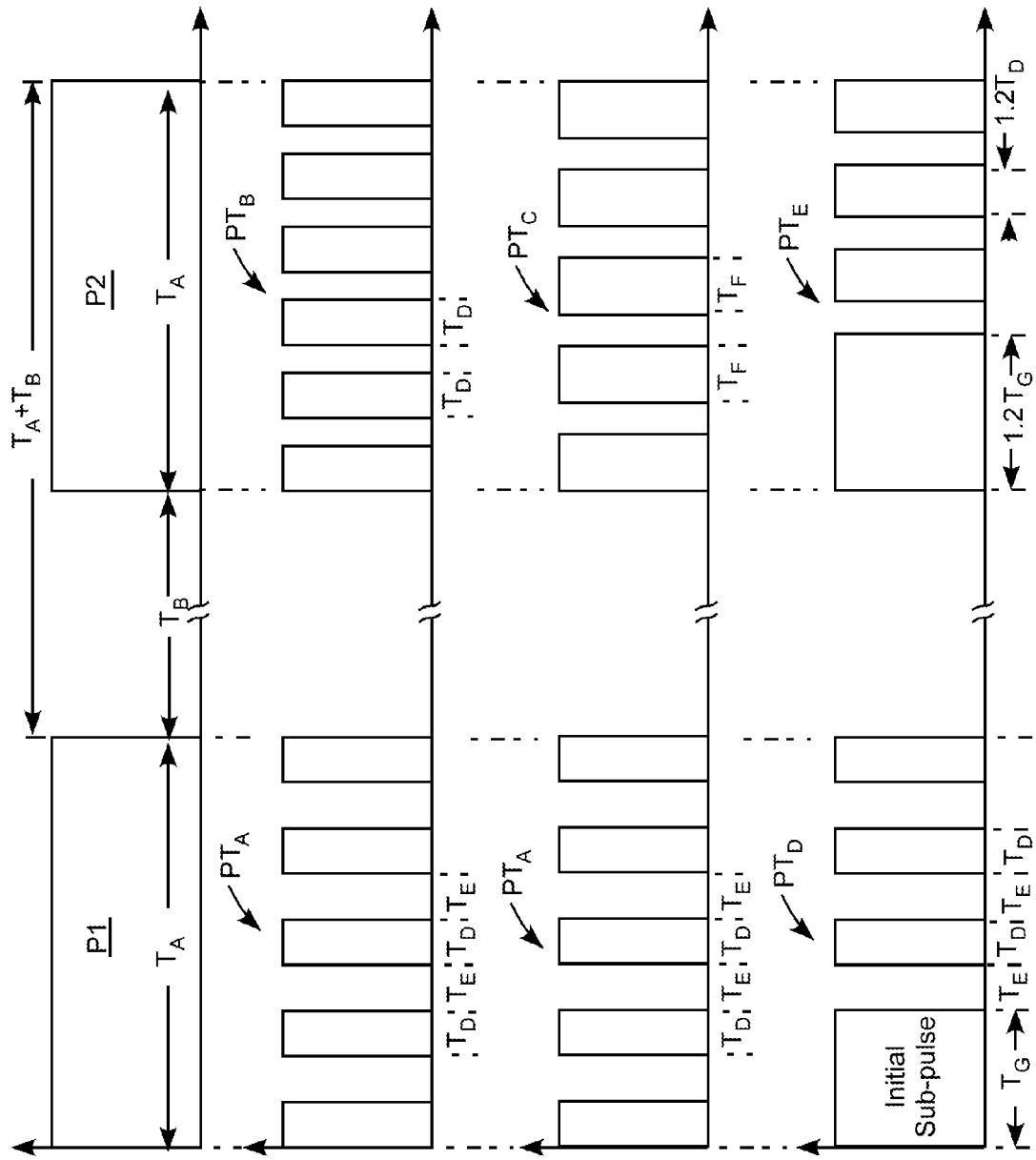
FIG. 4A is a graph schematically illustrating first and second consecutive prior-art RF excitation pulses assumed to have a time therebetween sufficiently short to cause in corresponding laser output pulses the peak power reduction of FIG. 2B.
FIG. 4B is a graph schematically illustrating intra-pulse modulation in accordance with the present invention, wherein the prior-art laser pulses of FIG. 4A are replaced with consecutive first and second equal-duration trains of shorter pulses, also of equal duration, but with the pulse repetition frequency of the second train of shorter pulses being increased to compensate for the peak power reduction effect of FIG. 2B by including more shorter pulses in the second train than in the first train.
FIG. 4C is a graph schematically illustrating intra-pulse modulation in accordance with the present invention, wherein the prior-art laser pulses of FIG. 4A are replaced with consecutive first and second equal-duration trains of shorter pulses, with the same number of pulses in each train but with the pulses in the second train having a longer duration than the pulses in the first train to compensate for peak power reduction effect of FIG. 2B.
FIG. 4D is a graph schematically illustrating intra-pulse modulation in accordance with the present invention similar to the scheme of FIG. 4C, but wherein the first pulse in each train thereof has a longer duration that the other pulses in the train for decreasing the rise time of corresponding laser pulses generated by the pulse trains.

FIGS. 4B, 4C, and 4D schematically illustrate three different embodiments of inter-pulse modulation of RF exciting pulses in accordance with the present invention. FIG. 4A is provided for comparison with FIGS. 4B-D and schematically illustrates first and second consecutive un-modulated (prior-art) RF pulses P1 and P2 with which modulated pulse trains of FIGS. 4B-D can be compared. In FIG. 4A each of the prior-art un-modulated pulses has the same duration $T_A$. There is a time $T_B$ between the termination of pulse P1 and the initiation of pulse P2. The pulse repetition period is $T_A+T_B$, equivalent to a PRF of $1/(T_A+T_B)$. A preferred value for TA is between about 25 µs and about 50 µs. A preferred value for TB is greater than about 200 µs.

Figure 3:
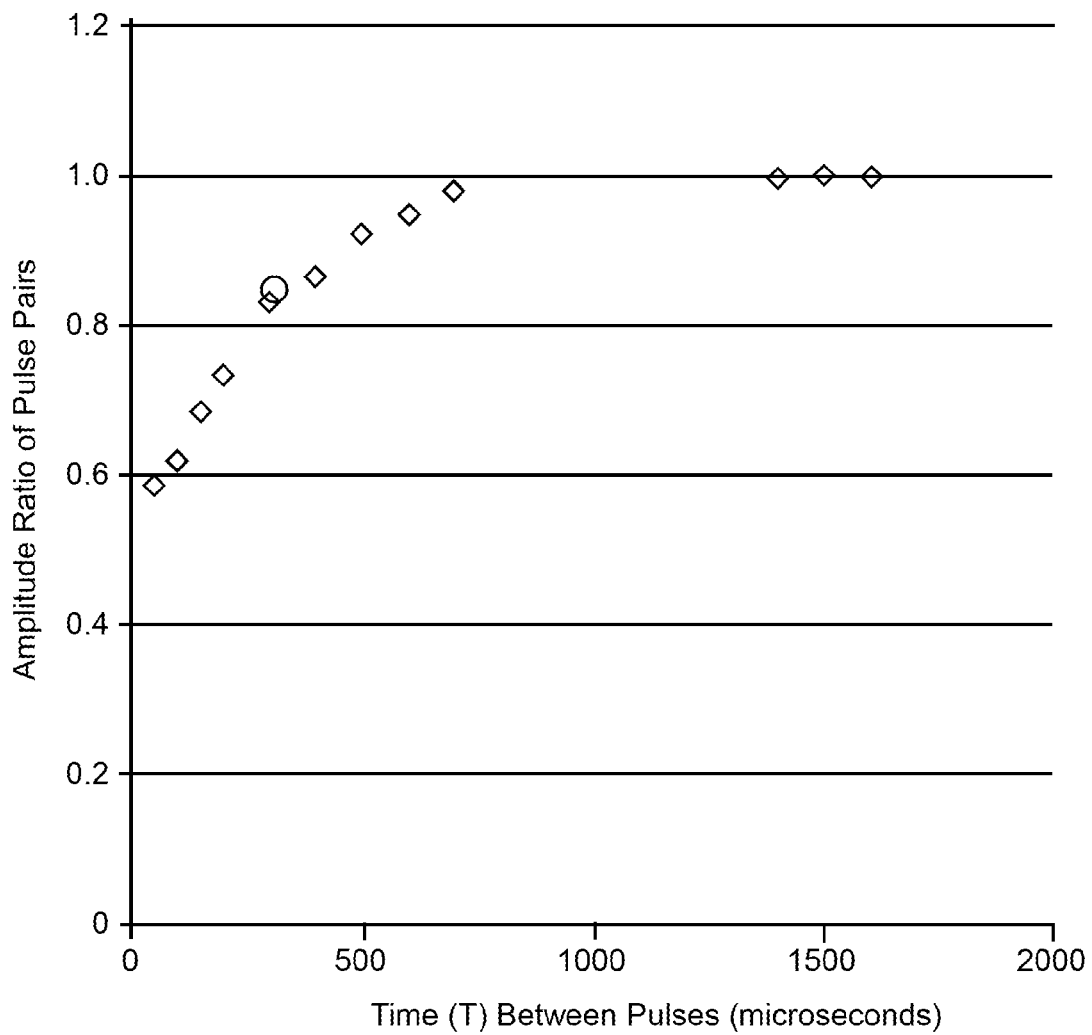
FIG. 3 is a graph schematically illustrating measured amplitude ratio between isolated laser-output pulse pairs as a function of time between pulses in a prior-art diffusion-cooled $CO_2$ laser.

For purposes of this description, it is assumed that time $T_B$ is in the about 750 µs-or-less range in which the power of a laser output pulse is reduced by the above-discussed gas-heating during the generation of an immediately preceding pulse (see FIG. 3). It is assumed that a look-up table has been formed by tabulating measured power ratio of consecutive pulses as a function of the inter-pulse period TB as depicted in FIG. 3.

In the inter-pulse modulation scheme of the present invention, in all embodiments thereof, the un-modulated (continuous) pulses of the prior art are replaced by bursts or trains of sub-pulses with a time between sub-pulses sufficiently short that the laser responds to the pulse train as though the train were a single continuous pulse. In order for this to occur, the inter-pulse period of the sub-pulses should be about 1 µs. A pulse train can be considered as a modulated pulse having the duration of the train of pulses, with a square modulation envelope, and 100% modulation depth. This provides for varying the power in so-modulated pulse conveniently by pulse-width modulation or PRF variation.

In the embodiment of FIG. 4B, continuous pulse P1 of FIG. 4A is replaced by a train $PT_A$ of five sub-pulses of equal amplitude. The pulses all have the same (sub-pulse on) duration $T_D$ and the same inter-pulse (sub-pulse off) period $T_E$ for a percent duty cycle for the modulation in the pulse train of $100*T_D/(T_D+T_E)$. From the experimentally determined look-up table and knowledge of $T_B$, it is determined how much additional power must be in a consecutive pulse-train $PT_B$ (having the same duration as train $PT_A$) such that consecutive laser pulses generated by the consecutive pulse trains have the same power. Here, it is assumed that $PT_B$ must have 1.2 times the power of $PT_A$ for the corresponding laser pulses to have equal power. In order to achieve this, $PT_B$ is a train of six sub-pulses having the same duration and amplitude as the sub-pulses of $PT_A$ and the duration of trains. This provides the additional power in the train by providing an extra sub-pulse, effectively increasing the duty cycle of $PT_B$ by a factor of 1.2 (6/5 in rational-fraction terms).

In the embodiment of FIG. 4C, continuous pulse P1 of FIG. 4A is again replaced by a train $PT_A$ of five sub-pulses of equal amplitude and duration as discussed above. A second pulse train $PT_C$ has the same number of sub-pulses at the same PRF as in train $PT_A$ but the duration (temporal "width") of the of the sub-pulses in $PT_C$ is increased by the 1.2 factor to provide the additional RF power for keeping the laser-pulse power constant. Again, as the duration of $PT_C$ is the same as that of $PT_A$, the duty cycle is $PT_C$ is 1.2 times that of $PT_A$.

In the embodiment of FIG. 4D, pulse P1 is replaced by a pulse-train $PT_D$ including an initial sub-pulse SP1 having a duration $T_G$ that is relatively long compared with the duration of the train, for example, about one-half of the duration of the train. Remaining sub-pulses have a duration and duty cycle comparable to the duration and duty cycle in the of sub-pulse pulses in the embodiments of FIGS. 4B and 4C. Here, the sub-pulses are designated as having duration $T_D$.

Figure 1A:
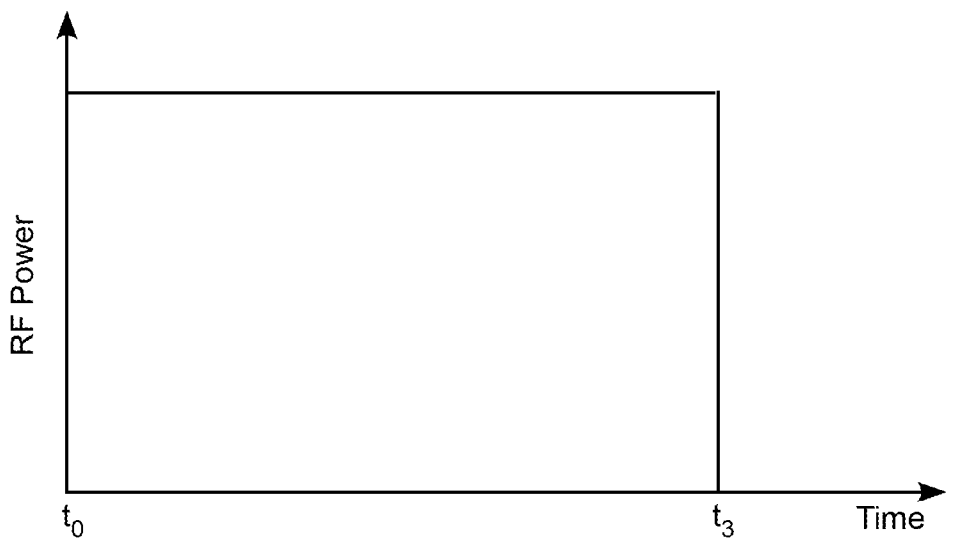
FIG. 1A and FIG. 1B form a timing diagram schematically illustrating a relationship between power as a function of time of a RF pulse and a corresponding laser output pulse in a prior-art diffusion-cooled $CO_2$ laser.
Figure 1B:
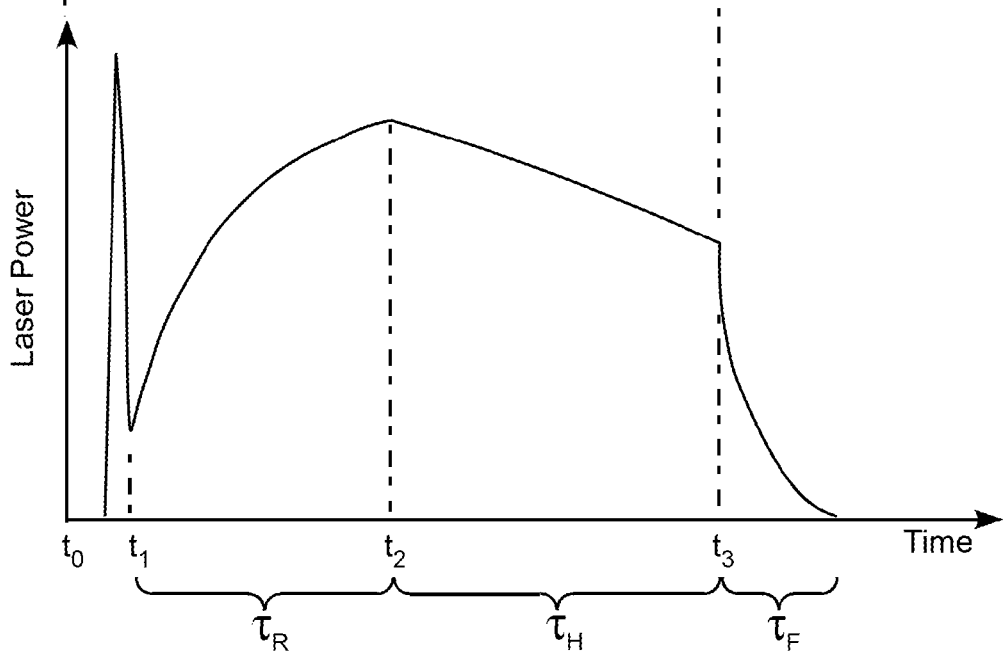
Figures 2A, 2B:
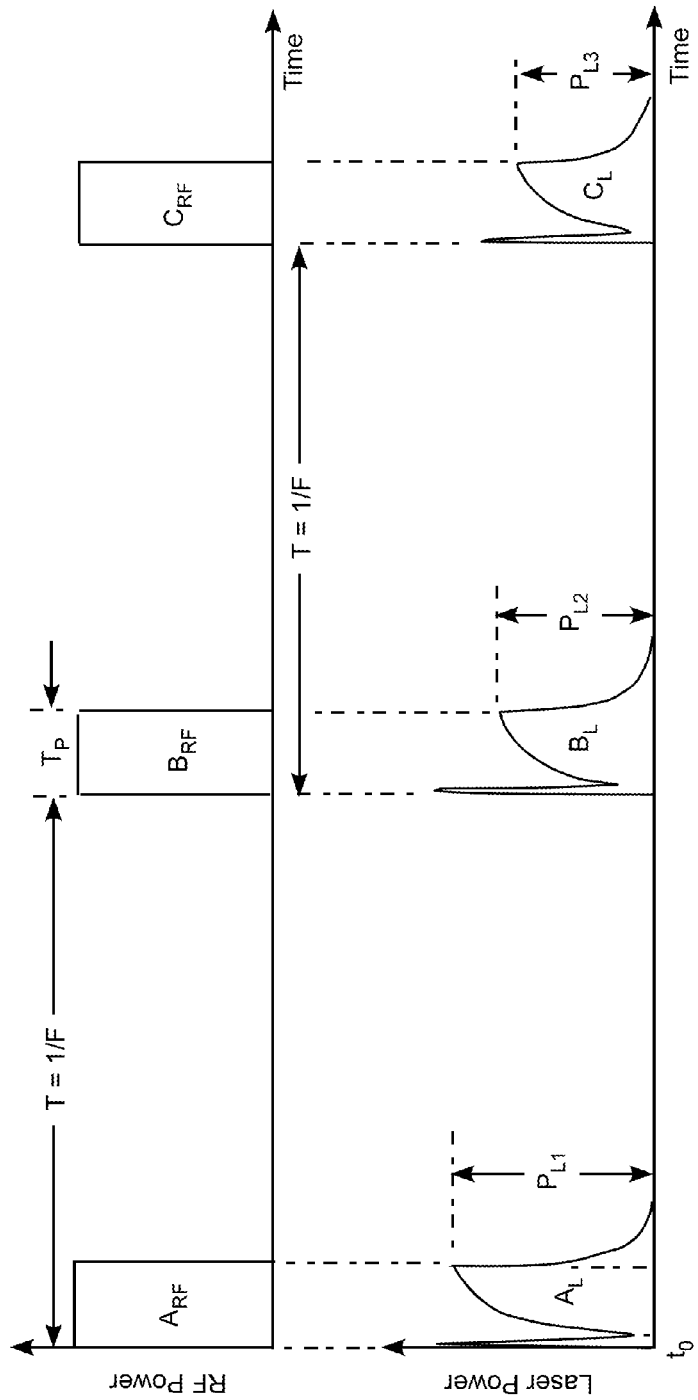
FIG. 2A and FIG. 2B form a timing diagram schematically illustrating a relationship between power as a function of time of a train of RF pulses and a corresponding train of laser-output pulses in a prior-art diffusion-cooled $CO_2$ laser, wherein peak pulse power is reduced from one pulse to the next as a result of lasing-gas heating by the RF pulses.

A reason for initiating train $PT_D$ with a relatively long sub-pulse is to increase the power in the leading edge of a corresponding laser pulse to provide a temporal shape to the laser pulse that is "square" or "rectangular" compared to the "peaked" pulses of FIG. 2B. Such "square" or "rectangular" pulses are desirable in certain laser processing operations. This intra-pulse modulation scheme is useful even in cases where laser output pulse temporal separation is long-enough that the same modulation can be applied to a subsequent pulse. If correction is required, however, this can be provided by proportionally increasing the duration of all sub-pulses in a next exciting pulse train. This is illustrated in FIG. 4D, wherein the duration of all sub-pulses in a train $PT_E$ is increased by a factor of 1.2.

It should be noted here that the pulses and sub-pulses schematically depicted in FIGS. 4A-D are actually envelopes of the RF frequency oscillations (not shown) of the power supply. This RF frequency is typically on the order of 100 megahertz (MHz), i.e., an oscillation period is on the order of 0.01 µs.

Figure 5:
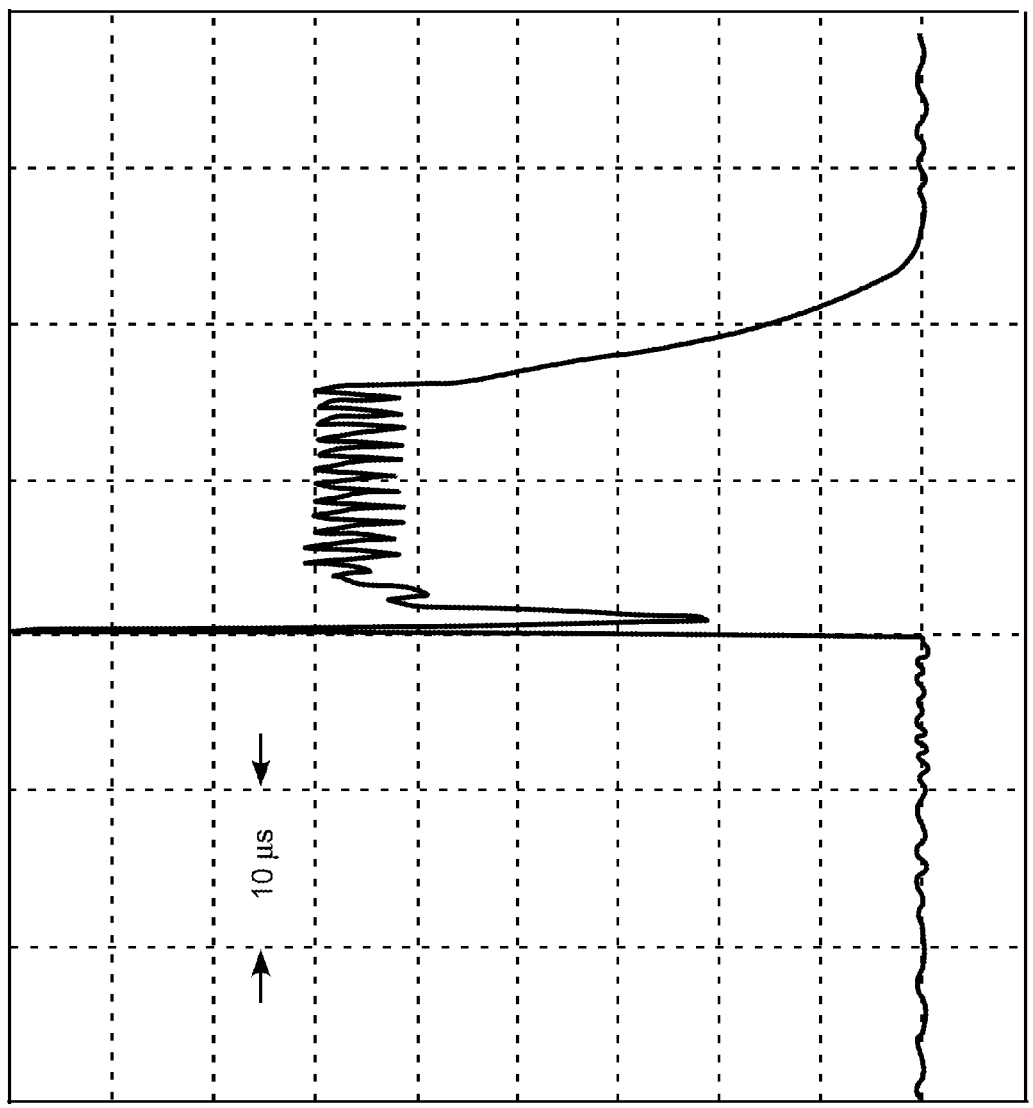
FIG. 5 is a reproduction of an oscilloscope trace schematically illustrating a measured laser pulse generated by a 25 microsecond-long RF pulse-train similar to the pulse-trains of FIG. 4D but wherein there are 12 sub-pulses following the longer first sub-pulse.

FIG. 5 is a reproduction of an oscilloscope trace schematically illustrating a measured laser pulse generated by a 25 microsecond-long RF pulse-train consisting of an initial sub-pulse having a duration of 13 µs followed by twelve sub-pulses delivered with a duty cycle of 65%. The above-discussed "gain-spike" effect at the beginning of the pulse is clearly evident and is real. The apparent modulation of the "flat" portion of the pulse is electronic noise or "ringing" in the detector used for the pulse measurement, and is not actually present in the laser pulse. It is not the laser response to the modulated RF pulse train.

Figure 6:
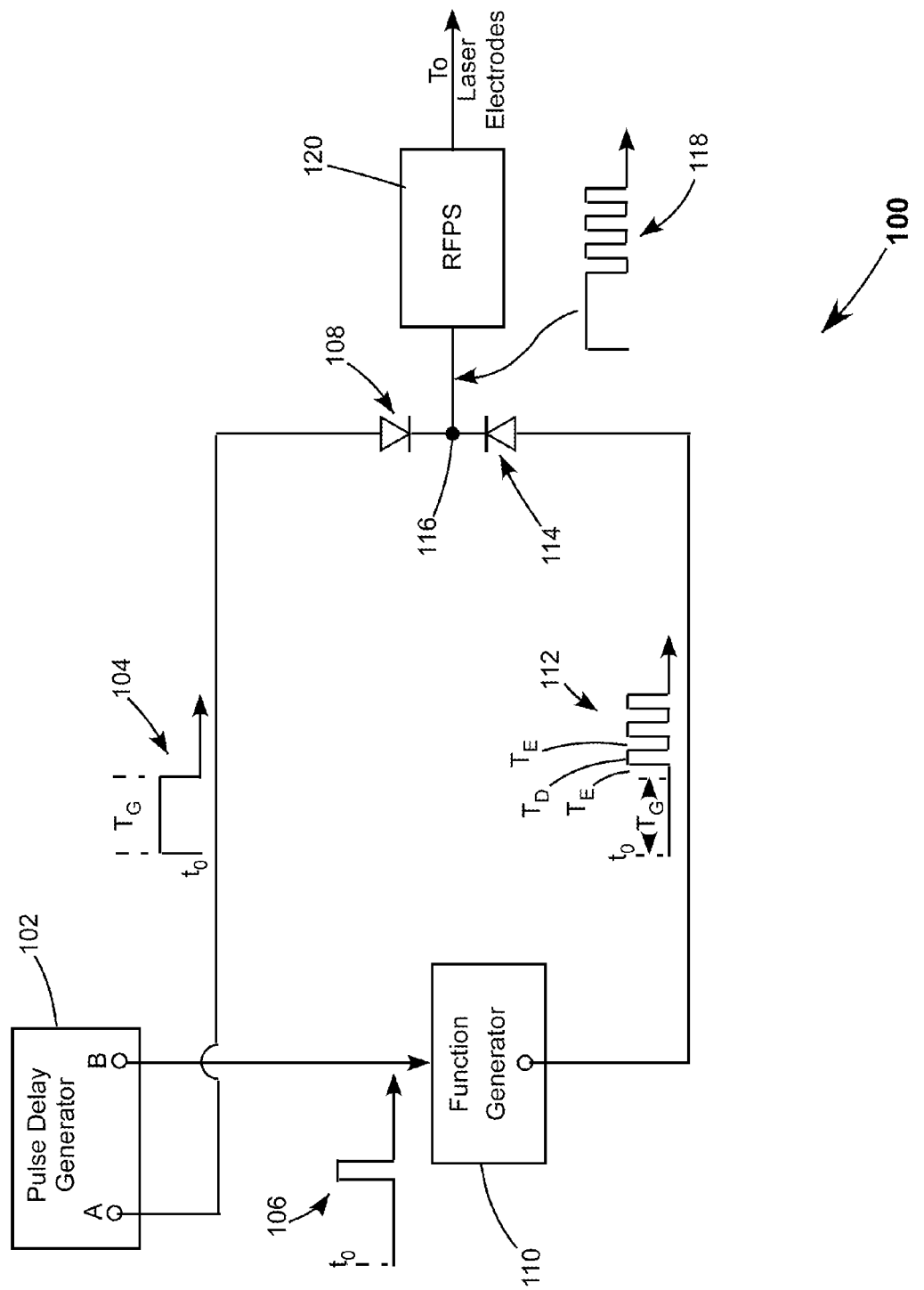
FIG. 6 is a high level circuit diagram schematically illustrating experimental apparatus used for the generation of the laser pulse of FIG. 5.

Experimental apparatus 100 used to generate the pulse of FIG. 5 is schematically illustrated in FIG. 6. A pulse-delay generator 102 was used to generate two synchronized pulses 104 and 106 out of terminals A and B, respectively. The pulse-durations and separation of the pulses are adjustable. The delay-generator was Model DG 535 generator, made by Stanford Research Systems Inc. of Sunnyvale, Calif. Pulse 104 is emitted earlier than pulse 106. The duration of the pulse from terminal A was selected to be the desired duration of the initial long sub-pulse in the pulse-train (duration $T_G$ in terms of train $PT_D$ in FIG. 4D).

Pulse 106 is used to trigger a function generator 100. The function generator used was a Model No. 33220A function generator available from Agilent Inc of Sunnyvale, Calif. The function generator was adjusted to emit a train of pulses (here, 3 pulses) having a duration than $T_G$ (duration $T_D$ in terms of train $PT_D$ in FIG. 4D). Duration $T_D$ and the chosen duty-cycle and duration of the pulse train determines the intra-pulse duration (duration $T_E$ in terms of train $PT_D$ in FIG. 4D). The pulse train is triggered by pulse 106 at a time TG+TE after $t_0$ and appears as pulse train 112 in FIG. 5. Pulse 104 and pulse train 112 are connected to diodes 108 and 114, connected in opposition. The pulse trains are summed at node 116 between the diodes to provide a pulse train 118 (equivalent of pulse train $PT_D$ in FIG. 4D) which is used to command RF pulses from a RFPS 120 connected to discharge-electrodes of the laser.

It should be noted here that the experimental circuit of FIG. 6 is capable merely of forming a modulated pulse (pulse train) of the type depicted in FIG. 4D for "squaring-up" laser output pulses. The circuit does not have any provision for implementing pulse-to-pulse output-power control by the inventive intra-pulse modulation in any of the modes of FIGS. 4B-D.

Figure 7:
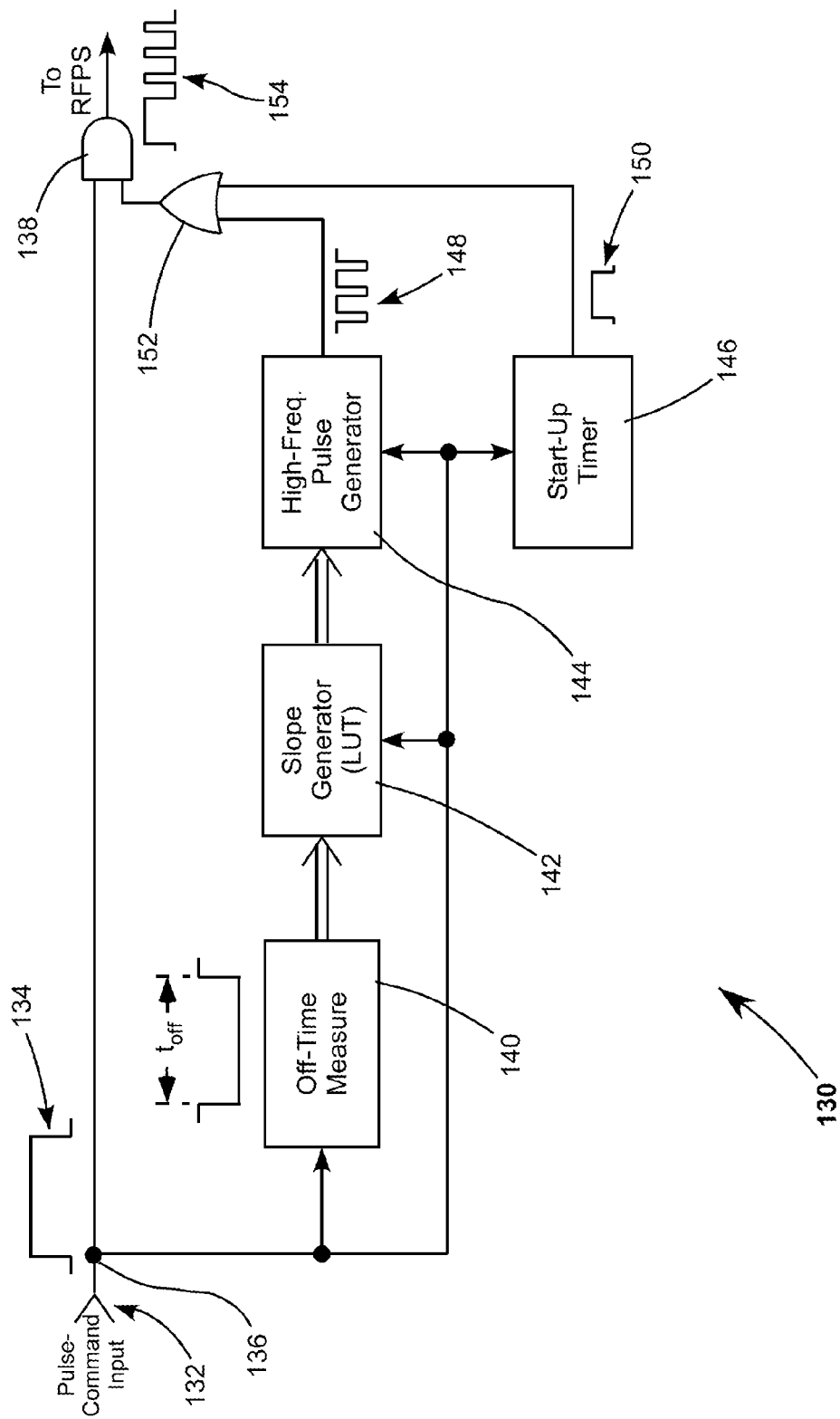
FIG. 7 is a high level circuit diagram schematically illustrating one example of circuitry for implementing pulse-power control by intra-pulse modulation in accordance with the present invention.

FIG. 7 is a high level circuit diagram 130 schematically illustrating one example of circuitry for implementing pulse-to-pulse pulse-power control by intra-pulse modulation in accordance with the present invention. A description of the circuitry is set forth below with reference in addition to FIGS. 8A, 8B, 8C, and 8D, and to FIG. 4A and FIG. 4D. In this description, it is assumed that a sub-pulse train of the "squaring-up" type depicted in FIG. 4D, for example, sub-pulse train $PT_D$, has already been generated.

At terminal 132 a user provided (from a PC, microprocessor, or the like) pulse-command 134 is provided. Command 134 can be equated to a prior-art (un-modulated) pulse P2 of FIG. 4A, with a similar command, corresponding to pulse P1 of FIG. 4A having previously been delivered. Pulse 134 is split at node 136 with one-portion being connected to one input of an AND-gate 138, another part being connected to an off-time measuring circuit 140, and another part being connected to a slope-generator 142 including a look-up table (LUT) including data relating time between pulse-commands to pulse-train duty-cycles as described above. Yet another part of the command pulse is connected to both a high-frequency pulse-generator 144 and a start-up timer 146. The duration of command-pulse 134 determines the duration of the train of sub-pulses corresponding to the command, for example, sub-pulse train $PT_E$ of FIG. 4D.

Off-time measuring circuit 140 measures the time $t_{off}$ that has elapsed since the end of the previous pulse-command. This is transmitted to circuit 142 that determines a duty-cycle value from the stored LUT. The duty-cycle vale is that required to equalize power in the sub-pulse train to be delivered ($PT_E$ of FIG. 4D) with that power delivered by the previous sub-pulse train ($PT_D$ of FIG. 4D). The required duty-cycle value is communicated to high-frequency pulse-generator 144. The duty-cycle value is interpreted as a required increase in PRF of sub-pulses in the train (as depicted in FIG. 4B) or as an increase in the duration of sub-pulses in the trains (FIGS. 4C and 4D). Whatever method is implemented, pulse-generator 144, in response to receiving a portion of command-pulse 134, emits a train 148 of negative-going pulses (corresponding to required sub-pulses) having the selected PRF of, or a duration which corresponds to the inter-pulse period of pulses in the desired sub-pulse train.

In response to receiving a portion of command-pulse 134, start-up timer 146 generates a positive-going pulse 150 having a duration corresponding to an extended initial pulse in the sub-pulse train. The duration of pulse 150 can be constant from sub-pulse train to sub-pulse train or adjusted from pulse-train to pulse-train using duty-cycle or pulse-duration data from LUT 110, relayed from high-frequency pulse-generator 144. Negative going pulse-train 148 and pulse 150 are connected to separate inputs of an OR-gate 152. When a signal from either pulse is present at one of the two inputs of the OR-gate, an output signal to the other input of AND-gate is provided. The output of the AND-gate is a sub-pulse train 154 similar to sub-pulse PTE of FIG. 4D. This sub-pulse train is terminated by the falling edge of command-pulse 134, which also resets pulse-generator 144 and start-up timer 146 in anticipation of another pulse-command.

Figure 7A:
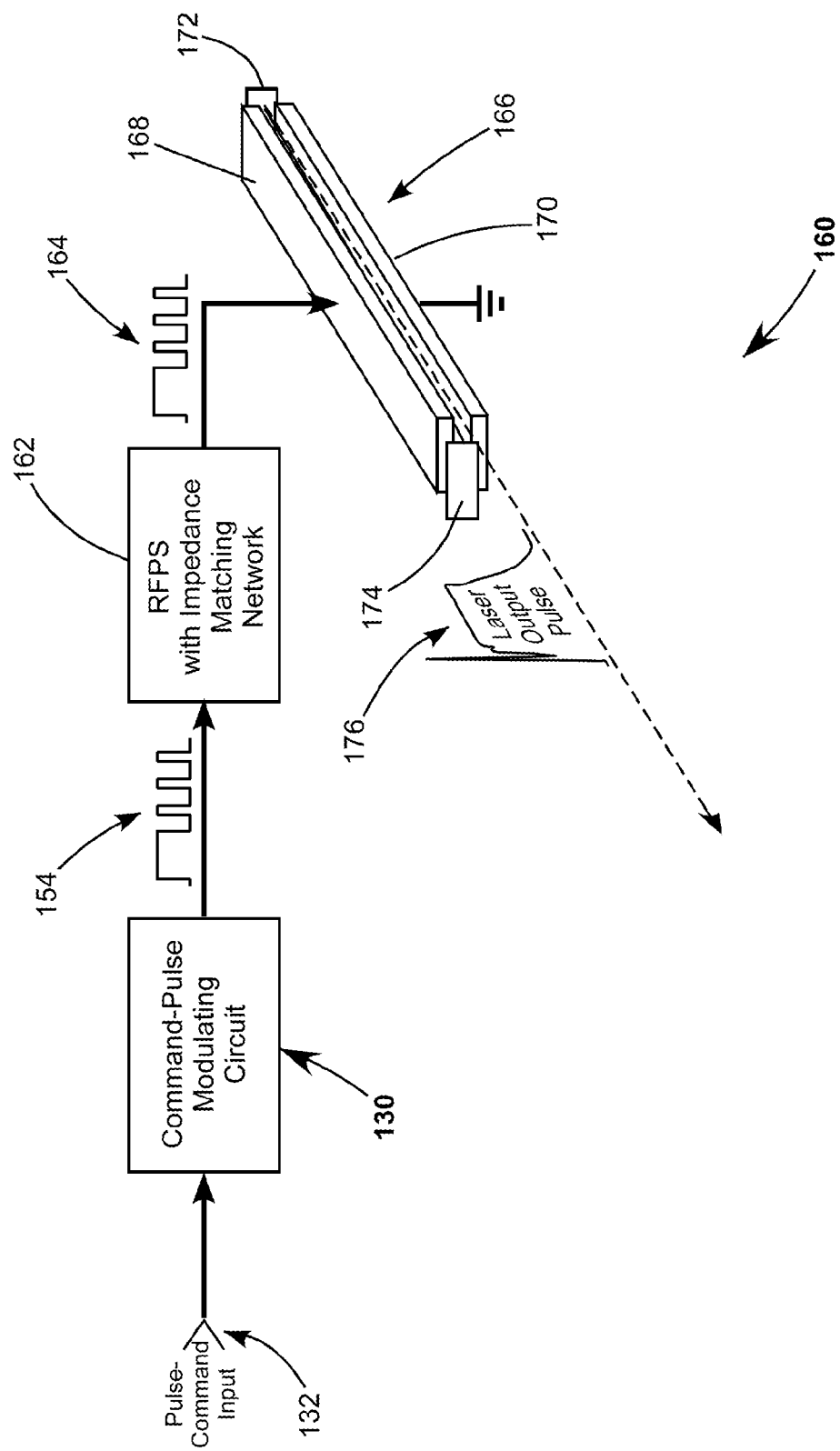
FIG. 7A schematically illustrates a gas-discharge laser incorporating the circuitry of FIG. 7.
Figure 8A:
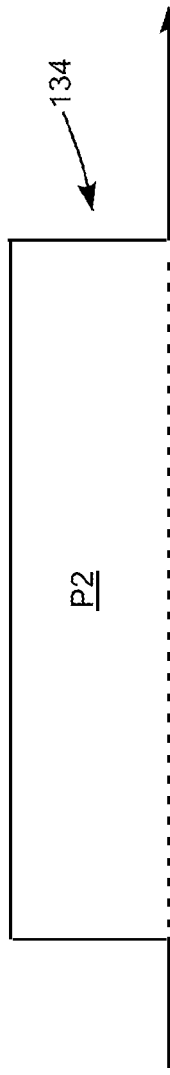
FIGS. 8A, 8B, 8C, and 8D are graphs schematically illustrating one mode of operation in the circuitry of FIG. 7.
Figure 8B:
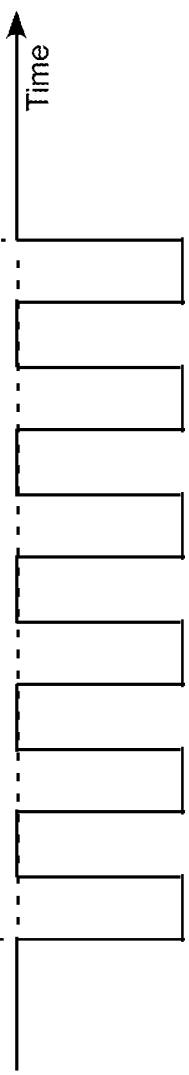
Figure 8C:
Figure 8D:
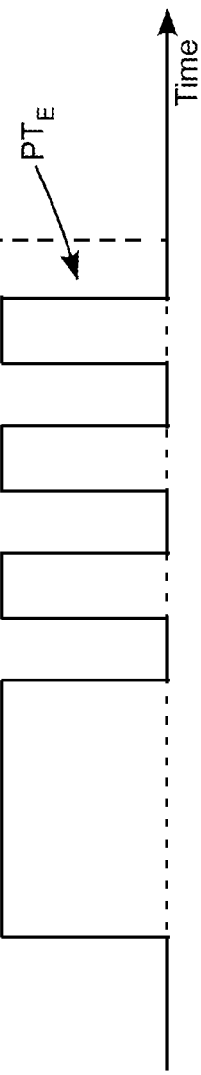

FIG. 7A schematically illustrates the command-pulse modulating circuit of FIG. 7A incorporated in a gas discharge laser 160 in accordance with the present invention. Pulse-train (modulated command pulse) 154 from circuit 130 is delivered to a RFPS 162. In response to receiving the modulated command pulse, the RFPS delivers a corresponding train of RF sub-pulses, i.e., a modulated RF pulse, to an electrode assembly 166 including a live or "hot" electrode 168 and a grounded electrode 170. Pulses in this train may be characterized as excitation pulses. RFPS 162 includes an impedance matching network to match the output impedance of the RFPS to the impedance of the electrodes, as is known in the art. A laser-resonator, here an unstable laser-resonator) is formed between mirrors 172 and 174. The electrodes and resonator are in a housing (not shown) including a lasing gas mixture, as is also known in the art. As noted above, in the method of the present invention, the time between sub-pulses is made sufficiently short that the lasing gas mixture energized by sub pulse-train responds as though the sub-pulse train were a continuous pulse. As a result, only a single laser output pulse 176 is delivered by the laser-resonator in response to energizing by sub-pulse train 164.

It should be noted here, that the circuit example of FIG. 7 is but one example of a circuit for implementing the intra-pulse modulation method of the present invention. From this circuit description and the description of the inventive intra-pulse modulation method presented herein, those skilled in the electronic art may devise other circuits for implementing the inventive method without departing from the spirit and scope of the present invention.

In summary, the present invention is described herein in terms of a preferred and other embodiments. The invention, however, is not limited to the embodiments described and depicted herein. Rather, the invention is limited only by the claims appended hereto.

What is claimed is:

1. A method of operating a gas-discharge laser for providing laser output in the form of laser output pulses, the laser including spaced-apart gas-discharge electrodes powered by a radio frequency power supply (RFPS), with a laser-resonator formed between the discharge electrodes, the method comprising:

delivering a first train of RF sub-pulses from the RFPS to the gas-discharge electrodes for energizing the laser-resonator, each sub-pulse in the train including a plurality of cycles of RF energy, the RF sub-pulses in the first train of RF sub-pulses being temporally spaced apart by a time sufficiently short that the laser-resonator responds to the first train of RF sub-pulses as though the first train of RF sub-pulses were a single RF pulse, whereby the laser-resonator delivers a first laser-output pulse in response to the energizing by the first train of RF sub-pulses and:

following delivery of the first train of RF sub-pulses, delivering a second train of RF sub-pulses from the RFPS to the gas-discharge electrodes for energizing the laser-resonator, each sub-pulse in the second train including a plurality of cycles of RF energy, the RF sub-pulses in the second train of RF pulses being temporally spaced apart by a time sufficiently short that the laser-resonator responds to the second train of RF sub-pulses as though the second train of RF sub-pulses were a single RF pulse, whereby, following delivery of the first single laser output pulse, the laser-resonator delivers a second laser-output pulse in response to the energizing by the second train of RF sub-pulses, and wherein one of the duration and number of RF sub-pulses in the second train thereof is selected such that the first and second laser output pulses have about equal power.

2. The method of claim 1, wherein the first train of RF sub-pulses includes an initial sub-pulse having a first duration followed by a plurality of sub-pulses having a second duration shorter than the first duration.

3. The method of claim 1 wherein all of the RF sub-pulses in the first train thereof have the same duration.

4. The method of claim 1, wherein the first and second trains of RF sub-pulses have about the same duration.

5. The method of claim 4, wherein the first and second trains of RF sub-pulses have the same number of sub-pulses therein.

6. The method of claim 5, wherein the RF sub-pulses in the first train thereon have a first duration and the RF sub-pulses in the second train thereof have a second duration, with the second duration being longer than the first duration.

7. The method of claim 5, wherein the first train of RF sub-pulses includes an initial sub-pulse having a first duration, followed by a plurality of sub-pulses each having a second duration, and second train of RF sub-pulses includes an initial sub-pulse having a third duration, followed by a plurality of sub-pulses each having a fourth duration, and wherein the third duration is longer than the first duration, and the fourth duration is longer than the second duration.

8. The method of claim 4, wherein the duration of RF sub-pulses in the first and second trains thereof is the same and the number of sub-pulses in the second train thereof is greater than the number of sub-pulses in the first train thereof.

9. The method of claim 1, wherein the selection of the number or duration of RF sub-pulses in the second train thereof is dependent on a time between a termination of the first laser output pulse and an initiation of the second laser output pulse.

10. Gas-discharge laser apparatus comprising:
spaced-apart discharge-electrodes;
a laser resonator extending between the discharge electrodes;
a radio-frequency power-supply (RFPS) connected to the discharge electrodes for energizing the laser resonator; and
an electronic circuit connected to the RFPS, the electronic circuit configured and arranged to receive a first command pulse, convert the command pulse to a first train of command sub-pulses, and deliver the first train of command sub-pulses to the RFPS, thereby causing the RFPS to deliver a corresponding first train of RF excitation sub-pulses to the laser resonator with the temporal spacing between the RF excitation sub-pulses being sufficiently short that the laser resonator responds to the first train of excitation sub-pulses as though the first train of excitation sub-pulses were a single RF excitation pulse, whereby the laser-resonator delivers a first single, laser-output pulse in response to the energizing by the first train of RF excitation sub-pulses and wherein the electronic circuit is further configured and arranged, following receipt of the first command pulse, to receive a second command pulse, determine a time between termination of the first command pulse and initiation of the second command pulse, convert the second command pulse to a second train of command sub-pulses, and deliver the second train of command sub-pulses to the RFPS, thereby causing the RFPS to deliver a corresponding second train of RF excitation sub-pulses to the laser resonator with the temporal spacing between the RF excitation sub-pulses being sufficiently short that the laser resonator responds to the second train of excitation sub-pulses as though the second train of excitation sub-pulses were a single RF excitation pulse, whereby the laser-resonator delivers a second single, laser-output pulse in response to the energizing by the second train of RF excitation sub-pulses, and wherein one of the number and duration of sub-pulses in the second train of command sub-pulses, and correspondingly in the second train of RF excitation sub-pulses, is selected, based on the determined time between termination of the first command pulse and initiation of the second command pulse, such that the first and second laser output pulses have about equal power.

11. A method of operating a gas laser, said laser including electrodes connected to a radio frequency (RF) power supply for exciting a gas between the electrodes, said method comprising the steps of:

generating a command to produce a first laser pulse;

in response to the command to produce a first laser pulse, delivering a first envelope of RF power to the electrodes, the first envelope including a first train of sub-pulses, each sub-pulse in the train including a plurality of cycles of RF energy;

generating a command to produce a second laser pulse; and in response to the command to produce a second laser pulse, delivering a second envelope of RF power to the electrodes, with the first and second envelopes having about the same duration, the second envelope including a second train of sub-pulses, each sub-pulse in the train including a plurality of cycles of RF energy, and wherein if the time between the end of the first laser pulse and the start of the second command to produce the second laser pulse is shorter than a predetermined period, then increasing the duty cycle of the sub-pulses in the second pulse train so that the energy in the second laser pulse more closely matches the energy in the first laser pulse.

12. A method as recited in claim 11 wherein the duty cycle in the second sub-pulse train is increased by an amount inversely proportional to the time between the end of the first laser pulse and the generation of the second command to produce the second laser pulse.

13. A method as recited in claim 11 wherein said predetermined period corresponds to the shortest time wherein the second laser pulse would still have about the same energy as the first laser pulse if the duty cycle of the first and second sub-pulse trains remained unchanged.

14. A method as recited in claim 11 wherein the duty cycle of the second sub-pulse train is increased by increasing the number of sub-pulses in the second pulse train.

15. A method as recited in claim 11 wherein the duty cycle of the second sub-pulse train is increased by increasing the length of the sub-pulses in the second pulse train.

16. A method as recited in claim 11 wherein the first sub-pulse in each train of pulses is longer than the remainder of the sub-pulses in the train.

17. A method as recited in claim 11 wherein the laser pulses are used to drill holes in a workpiece.

18. A method as recited in claim 11 wherein the laser pulses are used to drill a via hole in a printed circuit board.

* * * * *